United States Patent
Warner et al.

(10) Patent No.: US 7,348,887 B1
(45) Date of Patent: Mar. 25, 2008

(54) RFIDS EMBEDDED INTO SEMICONDUCTORS

(75) Inventors: Robert Warner, Holmdel, NJ (US); Jack Winters, Middletown, NJ (US); Bruce McNair, Holmdel, NJ (US)

(73) Assignee: Eigent Technologies, LLC, Holmdel, NJ (US)

( * ) Notice: Subject to any disclaimer, the term of this patent is extended or adjusted under 35 U.S.C. 154(b) by 315 days.

(21) Appl. No.: 11/153,074

(22) Filed: Jun. 15, 2005

Related U.S. Application Data

(60) Provisional application No. 60/600,577, filed on Aug. 11, 2004, provisional application No. 60/580,272, filed on Jun. 15, 2004.

(51) Int. Cl.
*G08B 13/14* (2006.01)

(52) U.S. Cl. ............... 340/572.3; 340/572.1; 340/10.1; 235/492

(58) Field of Classification Search ............ 340/572.8
See application file for complete search history.

(56) References Cited

U.S. PATENT DOCUMENTS

| | | | |
|---|---|---|---|
| 5,430,441 A * | 7/1995 | Bickley et al. ............ 340/10.2 |
| 5,606,313 A * | 2/1997 | Allen et al. ............ 340/10.31 |
| 5,828,753 A | 10/1998 | Davis | |
| 5,847,650 A * | 12/1998 | Zhou et al. ............ 340/572.6 |
| 5,874,902 A * | 2/1999 | Heinrich et al. ......... 340/10.51 |
| 5,920,690 A | 7/1999 | Moyer et al. | |
| 5,995,006 A * | 11/1999 | Walsh ............ 340/572.7 |
| 6,097,225 A | 8/2000 | Smith | |
| 6,107,920 A | 8/2000 | Eberhardt et al. | |
| 6,112,940 A | 9/2000 | Canella | |
| 6,135,291 A | 10/2000 | Canella | |
| 6,164,551 A | 12/2000 | Altwasser | |
| 6,209,098 B1 | 3/2001 | Davis | |
| 6,215,402 B1 | 4/2001 | Rao Kodukula et al. | |
| 6,220,516 B1 | 4/2001 | Tuttle et al. | |
| 6,249,227 B1 * | 6/2001 | Brady et al. ............ 340/572.1 |
| 6,259,408 B1 | 7/2001 | Brady et al. | |
| 6,268,796 B1 | 7/2001 | Gnadinger et al. | |
| 6,278,413 B1 | 8/2001 | Hugh et al. | |
| 6,285,342 B1 | 9/2001 | Brady et al. | |
| 6,303,958 B1 | 10/2001 | Kanaya et al. | |
| 6,317,028 B1 * | 11/2001 | Valiulis ............ 340/10.1 |
| 6,325,294 B2 | 12/2001 | Tuttle et al. | |
| 6,330,971 B1 * | 12/2001 | Mabry et al. ............ 340/10.1 |
| 6,375,780 B1 | 4/2002 | Tuttle et al. | |

(Continued)

*Primary Examiner*—Benjamin C. Lee
*Assistant Examiner*—Eric M. Blount
(74) *Attorney, Agent, or Firm*—Mathews, Shepherd, McKay & Bruneau, P.A.

(57) ABSTRACT

The present invention provides a RFID device comprising a radio frequency identification (RFID) transceiver and antenna element co-located with a semiconductor device, a method for making same and a method of using the RFID device of the present invention to locate, track and identify semiconductor devices and the devices they reside in. One embodiment of the RFID device of the present invention comprises a radio frequency identification (RFID) transceiver embedded within packaging of a semiconductor device. A second embodiment of the RFID device of the present invention comprises a radio frequency identification (RFID) transceiver as a separate circuit block within the semiconductor device. A third embodiment of the RFID device of the present invention comprises a radio frequency identification (RFID) transceiver as a separate independent circuit on top of the semiconductor device, System on Chip (SoC). These RFIDs can also be nested within an enclosure, or combined to increase the address length of the RFID.

31 Claims, 9 Drawing Sheets

U.S. PATENT DOCUMENTS

| | | |
|---|---|---|
| 6,424,263 B1 | 7/2002 | Lee |
| 6,424,315 B1 | 7/2002 | Glenn et al. |
| 6,452,411 B1 | 9/2002 | Miller et al. |
| 6,496,113 B2 | 12/2002 | Lee et al. |
| 6,511,877 B2 | 1/2003 | Kanaya et al. |
| 6,518,885 B1 * | 2/2003 | Brady et al. ............. 340/572.7 |
| 6,553,496 B1 | 4/2003 | Buer |
| 6,559,671 B2 | 5/2003 | Miller et al. |
| 6,578,180 B2 | 6/2003 | Tanner |
| 6,614,235 B2 * | 9/2003 | Kraz ......................... 340/10.1 |
| 6,616,034 B2 * | 9/2003 | Wu et al. ................... 235/375 |
| 6,646,328 B2 | 11/2003 | Tsai |
| 6,654,890 B1 | 11/2003 | Girard |
| 6,695,571 B1 | 2/2004 | Canella |
| 6,708,317 B2 | 3/2004 | Grisenthwaite |
| 6,749,115 B2 | 6/2004 | Gressel et al. |
| 6,757,832 B1 | 6/2004 | Silverbrook et al. |
| 6,873,259 B2 * | 3/2005 | Teraura ................... 340/572.1 |
| 6,933,848 B1 * | 8/2005 | Stewart et al. ........... 340/572.3 |
| 7,173,528 B1 * | 2/2007 | Stewart et al. ........... 340/572.3 |
| 2004/0185682 A1 * | 9/2004 | Foulke et al. .......... 340/870.07 |
| 2005/0212662 A1 * | 9/2005 | Amtmann et al. ....... 340/572.3 |
| 2007/0018828 A1 * | 1/2007 | Stewart et al. ........... 340/572.1 |

* cited by examiner

10

20

30

40

50

300

RFIDS EMBEDDED INTO SEMICONDUCTORS

CROSS REFERENCE TO RELATED APPLICATION

This application claims the benefit of U.S. Provisional Patent Application No. 60/580,272, filed Jun. 15, 2004, and U.S. Provisional Patent Application No. 60/600,577 filed Aug. 11, 2004, the entirety of both which are hereby incorporated by reference into this application.

BACKGROUND OF THE INVENTION

1. Field of the Invention

The present invention provides a radio frequency identification (RFID) transceiver and antenna element co-located with a conventional semiconductor device, a method for making same and the method of using the RFID devices of the present invention for locating, tracking and identifying semiconductor devices and the products in which they are implemented.

2. Description of Related Art

A radio-frequency identification (RFID) transceiver is a device that receives an electronic signal, generates a response signal, and then transmits the response signal. RFID transceivers have been used to locate, identify and track merchandise palettes, shipping containers on a palette or individual items within a container, on a retailer shelf or in use by an end user. The focus of RFID innovation has been on creating high volume, low cost RFID tags so that RFID devices can be universally deployed on low value items. Some attention has been paid to locating, identifying and tracking higher value items with RFID technology, but, since these items are less voluminous, cost reduction techniques (the efficiency benefits of using the RFID technology) can not be fully exploited.

Some RFID transceivers include one or more antennas that are electrically connected to an accompanying electronic circuit. The antenna portion of the RFID transceiver is generally many times larger than the electronic circuit itself. This is due to the common frequency bands utilized for RFID and the need for an antenna efficiency that provides sufficient range for the transmitted response signal. The incorporation of the antenna into the RFID IC package does reduce the cost significantly, but then the cost of the package becomes a significant portion of the RFID and limits the cost reduction possible.

Since the focus of RFID innovation has been on creating high volume, low cost RFID tags so that RFID devices can be universally deployed on low value items, there has been considerable attention paid to creating integrated circuits (ICs) that perform the RFID function.

U.S. Pat. Nos. 6,303,958 and 6,511,877 to Kanaya et al.; U.S. Pat. Nos. 6,424,263 and 6,496,113 to Lee et al.; U.S. Pat. No. 6,164,551 to Altwasser et al.; U.S. Pat. Nos. 6,220,516, 6,325,294 and 6,375,780 to Tuttle et al.; and U.S. Pat. No. 6,424,315 to Glenn et al., describe semiconductor devices that simply have low cost RFID functionality through the benefit of integrated circuitry. U.S. Pat. No. 6,424,315 describes using an antenna on top of an RFID IC with an insulating layer between the IC and antenna with a connection on top of an integrated circuit (IC). Implementation of the antenna on the IC provides an RFID transceiver that is small in size, physically rugged, and relatively inexpensive.

U.S. Pat. No. 6,518,885 to Brady et al. describes innovative packaging for RFID semiconductor devices that allows for an ultra-thin height.

U.S. Pat. No. 6,285,342 to Brady et al.; U.S. Pat. No. 6,646,328 to Tsai; U.S. Pat. No. 6,107,920 to Eberhardt et al.; U.S. Pat. No. 6,215,402 to Rao Kodukula et al.; U.S. Pat. No. 6,268,796 to Gnadinger et al.; U.S. Pat. No. 6,259,408 to Brady et al.; and U.S. Pat. No. 6,278,413 to Hugh et al. describe innovative antennas that can effectively be used with RFID semiconductor devices.

U.S. Pat. Nos. 6,112,940, 6,135,291 and 6,695,571 to Canella et al. and U.S. Pat. No. 6,330,971 to Mabry et al. describe the tracking and sorting of semiconductor devices by using separate RFID devices associated with the wafer and the sorting bins.

Attempts for using RFID devices for cost-effective circuit design and non-destructive fabrication test and analysis in order to verify the correctness, reliability, and functionality of integrated circuits after fabrication and ensure the widest coverage of trust issues for integrated circuits and using them for protection against reverse engineering have been described. U.S. Pat. Nos. 5,828,753 and 6,209,098 to Davis, describe two integrated circuit chips with cryptographic engines used solely to encrypt outgoing information being output across the interconnect or to decrypt incoming information received from the interconnect. U.S. Pat. No. 5,920,690 to Moyer et al. describes access protection in an integrated circuit whereby access protection circuitry includes access attribute bits which are compared to the access attributes of a memory request. U.S. Pat. No. 6,097,225 to Smith describes a validity circuit that is used with an analog circuit in a mixed signal system to determine whether the supply voltage is at an adequate voltage level to assure stable operation of the analog circuit. U.S. Pat. Nos. 6,452,411 and 6,559,671 to Miller et al. disclose a system for testing integrated circuit devices in which a tester communicates with a known good device through a channel. U.S. Pat. No. 6,553,496 to Buer describes security protection within an integrated circuit design and pertains particularly to integration of security modules on an integrated circuit so that operations cannot be probed or altered. U.S. Pat. No. 6,578,180 to Tanner describes a method and system for testing interconnected integrated circuits. U.S. Pat. No. 6,757,832 to Silverbrook et al. describes an authentication chip protected from unauthorized modification by storing data in intermediate states of the multi-level flash memory between the minimum and maximum voltage level states. U.S. Pat. No. 6,749,115 to Gressel et al. describes a monolithic integrated circuit with dual public key cryptographic protected central processing units in a computing device. U.S. Pat. No. 6,708,317 to Grisenthwaite relates to the validation of integrated circuit designs in which part of the design is obscured to maintain its confidentiality.

In addition, U.S. Pat. No. 6,654,890 describes a method to wirelessly authenticate laptops to prevent unauthorized users from being able to use the laptops. Also, many conventional car radios are disabled when removed from vehicles (i.e., the power supply) until the proper code is entered, to deter theft.

The above described patents concern using semiconductor technology to implement the RFID, antennas to be used with the RFID integrated circuits, tracking and sorting semiconductors using separate RFID devices or non-RFID circuit methods of verifying the correctness, reliability, functionality and trustworthiness of integrated circuits, or providing a means to protect an IC or enclosure from reverse engineering. As discussed above, although these patents describe methods that can reduce the cost and size of the RFID, further cost and size reduction is essential for widespread deployment of RFIDs.

It is desirable to provide a radio frequency identification (RFID) transceiver and antenna element co-located with a standard semiconductor device such that the semiconductor device can be located, tracked and identified itself.

SUMMARY OF THE INVENTION

The present invention provides a RFID device comprising a radio frequency identification (RFID) transceiver and antenna element co-located with a semiconductor device, a method for making same and a method of using the RFID device of the present invention to locate, track and identify semiconductor devices and the devices they reside in.

One embodiment of the RFID device of the present invention comprises a radio frequency identification (RFID) transceiver embedded within packaging of a semiconductor device. A second embodiment of the RFID device of the present invention comprises a radio frequency identification (RFID) transceiver as a separate circuit block within the semiconductor device. A third embodiment of the RFID device of the present invention comprises a radio frequency identification (RFID) transceiver as a separate independent circuit on top of the semiconductor device, System on Chip (SoC). In each embodiment, the RFID antenna is made to fit within the dimensions of the semiconductor device, has a low profile, has low cost, and exhibits good performance.

In all cases, the packaging cost of the RFID is eliminated as it is included with the packaging of the semiconductor, dramatically reducing the cost of implementing the RFID. In addition, when the RFID transceiver is a separate circuit block or independent circuit within the semiconductor device, the additional circuitry cost of the RFID is nearly eliminated.

The RFID device of the present invention can be used for locating, identifying and tracking of the semiconductor device which can be a low value item, with RFID technology throughout the logistics process as a stand-alone low value product. Alternatively, the RFID device of the present invention can be used for locating, identifying and tracking of the semiconductor device throughout the logistics process as an element within a high value product for which the semiconductor device forms the basis. Through repetitive logistics usage, RFID transceivers can also be cost-effectively applied to less voluminous, high value semiconductor products and semiconductor-based products to exploit the efficiency and effectiveness benefits of RFID technology.

In the present invention, the RFID transceiver and antenna is co-located with another integrated circuit (IC), either in a hybrid package or as part of the integrated circuit (IC), thus eliminating packaging costs for the RFID. Even if the integrated circuit (IC) does not need to be tracked by an RFID, many devices have integrated circuits (ICs) in them, allowing for the RFID to be added to a device at very low cost.

The RFID device of the present invention can be used for cost-effective circuit design and non-destructive fabrication test and analysis in order to verify the correctness, reliability, and functionality of integrated circuits after fabrication and ensure optimal coverage of trust issues for integrated circuits. The RFID transceiver can be included in a package of an integrated circuit (IC) device to allow the integrated circuit (IC) device to be tested for functionality without opening the package or device. The use of the RFID device of the present invention allows manufacturers, wholesalers, retail stores and service centers of all types to monitor integrated circuit (IC) devices for internal damage and repair issues at any time.

The RFID device of the present invention provides locating, tracking and identifying of semiconductor devices and the products in which they are implemented.

The RFID device of the present invention can be used for protection against reverse engineering by permanently modifying or destroying an integrated circuit (IC) if the integrated circuit (IC) package or enclosure is opened without first providing a proper encoded signal from a user-specified RFID reader or a nested RFID connected to the radio frequency electronics enclosure. The presence of the proper encoded signal allows access to the radio frequency electronics without alteration or destruction. The RFID device of the present invention can be used to either permanently or temporarily disable a device to deter theft.

The RFID device of the present invention can be used to destroy or disable an electronic device, such as an integrated circuit (IC) or the subcomponent of a system, upon command from a RFID probing device. The invention will be more fully described by reference to the following drawings.

DETAILED DESCRIPTION

Figure 1:
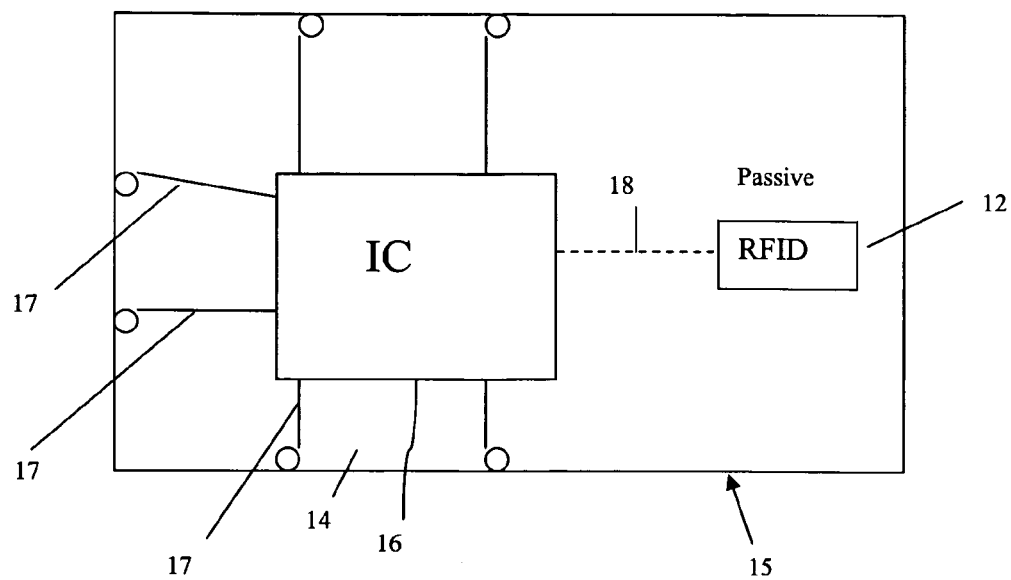
FIG. 1 is a schematic diagram of an embodiment of the RFID device of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of RFID device 10 in accordance with the teachings of the present invention. RFID device 10 comprises radio frequency identification (RFID) transceiver 12 embedded within packaging 14 of semiconductor device 15. In one embodiment, packaging 14 can be a carrier. Semiconductor device 15 comprises integrated circuit (IC) 16 and connections 17. For example, semiconductor device 15 can be a conventional semiconductor device. RFID transceiver 12 can be a passive RFID. Interconnection 18 can be used for connection between RFID transceiver 12 and integrated circuit (IC) 16. Interconnection 18 provides for transmission of probe signals, response signals and the like. Integrated circuit (IC) 16 is separate from (RFID) transceiver 12 and performs processing separate from (RFID) transceiver 12.

RFID transceiver 12 can be the implemented in the same technology as integrated circuit (IC) 16 in which it is packaged, such as SiGe, GaAs, Si, and the like. Alternatively, RFID transceiver 12 can be a separate integrated circuit (IC) 16 of a different technology as a hybrid package or integrated circuit (IC) 16.

Figure 2:
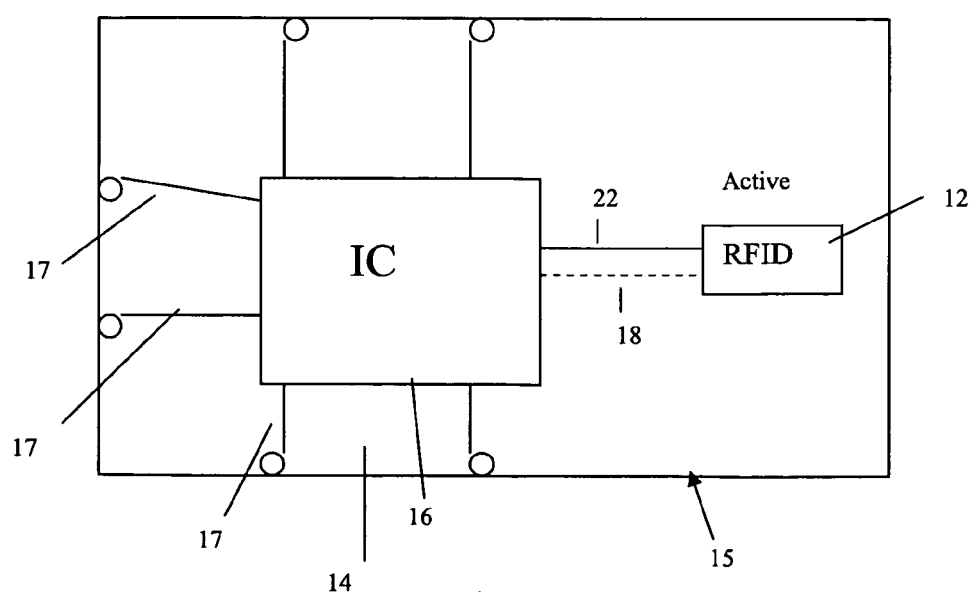
FIG. 2 is a schematic diagram of an alternate embodiment of the RFID device of the present invention.

In an alternate embodiment, RFID device 20 comprises active RFID, as shown in FIG. 2. Power connection 22 is provided from RFID transceiver 12 to integrated circuit (IC) 16 to provide the active RFID. RFID device 10 and RFID device 20 comprise radio frequency identification (RFID) transceiver 12 as a separate circuit block within semiconductor device 15.

Figure 3:
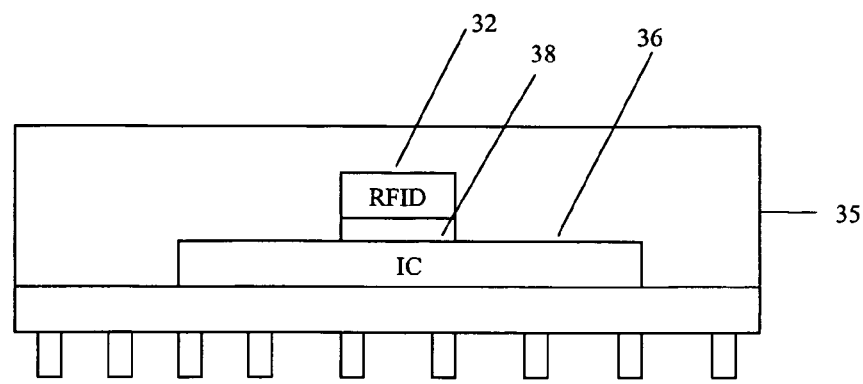
FIG. 3 is a schematic diagram of an alternate embodiment of the RFID device of the present invention.

FIG. 3 is a schematic diagram of RFID device 30 in accordance with the teachings of the present invention. Radio frequency identification (RFID) transceiver 32 is a separate independent circuit on top of integrated circuit (IC) 36 of semiconductor device 35 to form a System on Chip (SoC). Semiconductor device 35 comprises integrated circuit (IC) 36. For example, semiconductor device 35 can be a conventional semiconductor device. Interconnection 38 can be used for providing a connection between RFID transceiver 32 and integrated circuit (IC) 36. Interconnection 38 provides for transmission of probe signals, response signals and the like.

RFID transceiver 12 and RFID transceiver 32 have dimensions to fit within the dimensions of respective semiconductor device 15 or semiconductor device 35. RFID transceiver 12 and RFID transceiver 32 have a low profile, low cost, and exhibit good performance. For example, ceramic chip antennas, slot antennas and dielectric resonator antennas can be used in RFID transceiver 12 and RFID transceiver 32.

Figure 4:
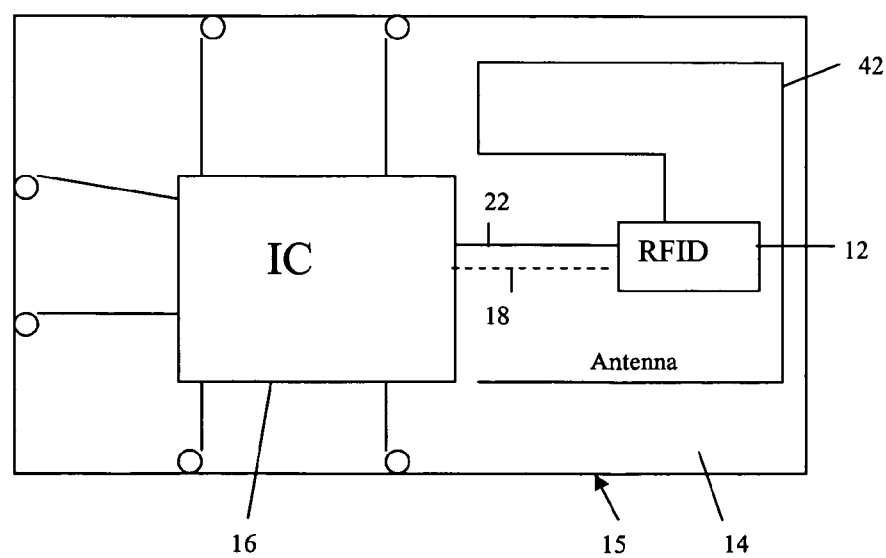
FIG. 4 is a schematic diagram of an alternate embodiment of the RFID device of the present invention.

FIG. 4 is a schematic diagram of RFID device 40 in accordance with the teachings of the present invention. Antenna 42 is located on or around RFID transceiver 12 within packaging 14 of semiconductor device 15. Antenna 42 can be located on packaging 14.

In one embodiment, antenna 42 can be placed above entire integrated circuit (IC) 16 and RFID transceiver 12. This embodiment provides additional room for antenna 42 as integrated circuit (IC) 16 is typically many times the size of RFID transceiver 12 and space for the antenna is available on or around integrated circuit (IC) 16.

Figure 5:
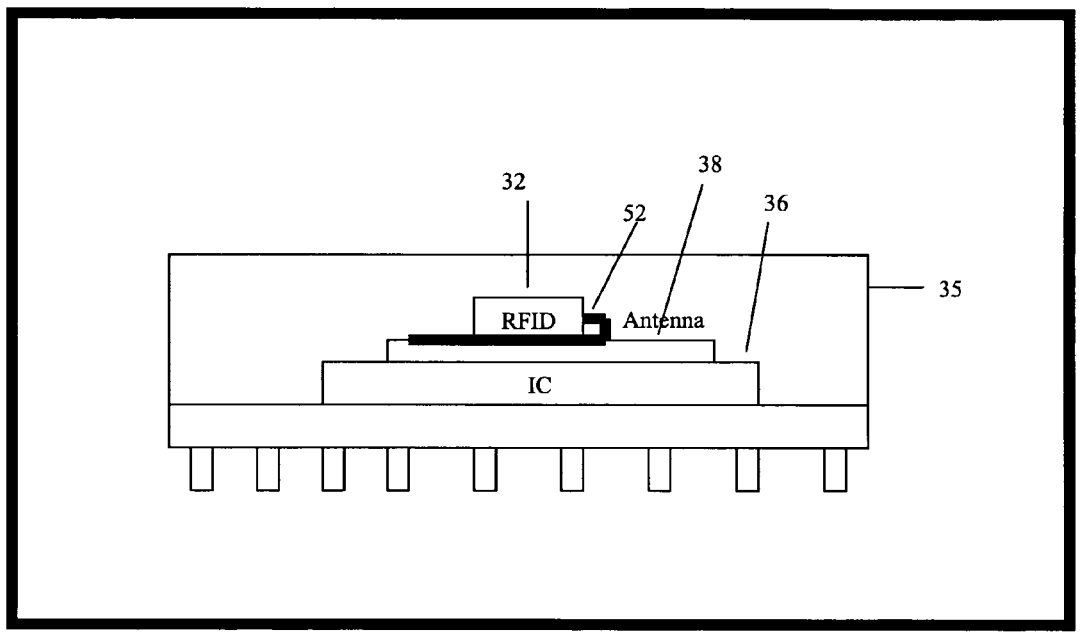
FIG. 5 is a schematic diagram of an alternate embodiment of the RFID device of the present invention.
Figure 6:
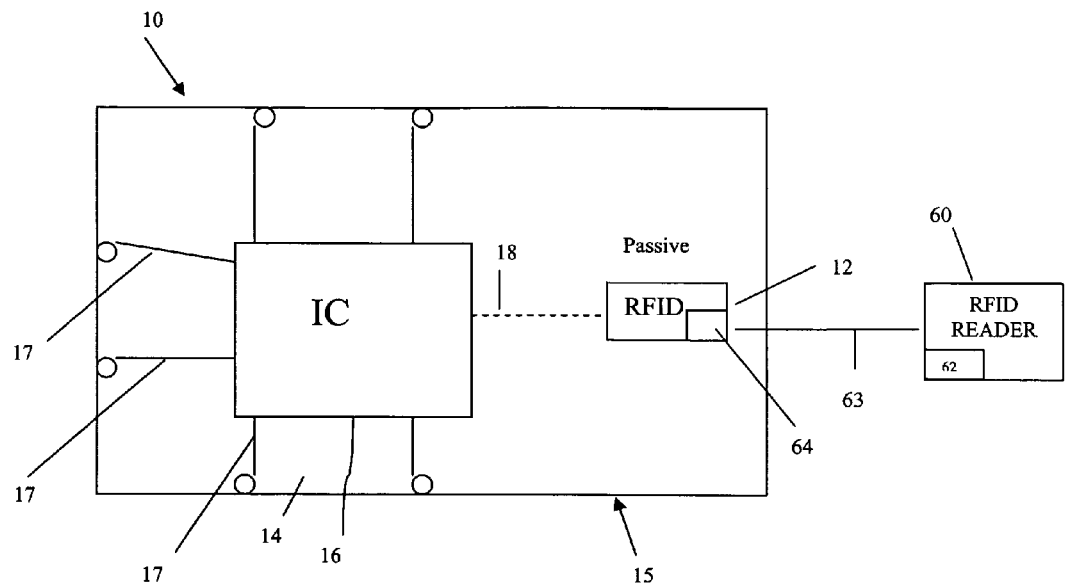
FIG. 6 is a schematic diagram of the RFID device shown in FIG. 1 in communication with an RFID reader.
Figure 7:
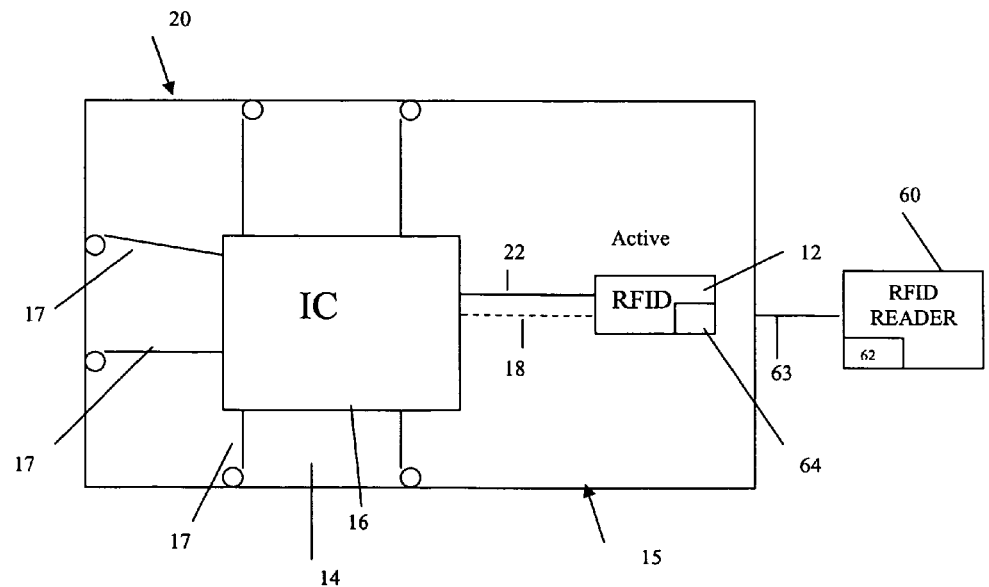
FIG. 7 is a schematic diagram of the RFID device shown in FIG. 2 in communication with an RFID reader.
Figure 8:
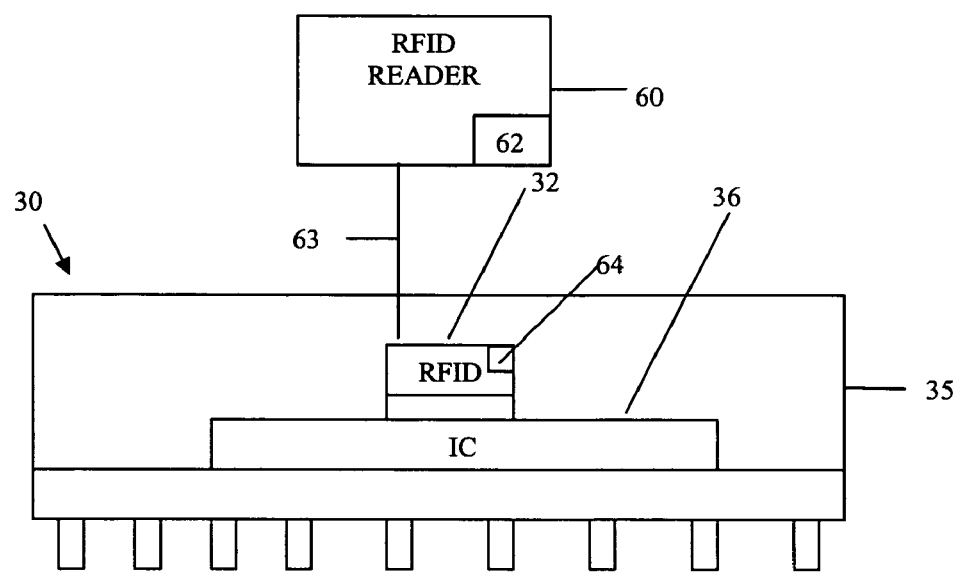
FIG. 8 is a schematic diagram of the RFID device shown in FIG. 3 in communication with an RFID reader.
Figure 9:
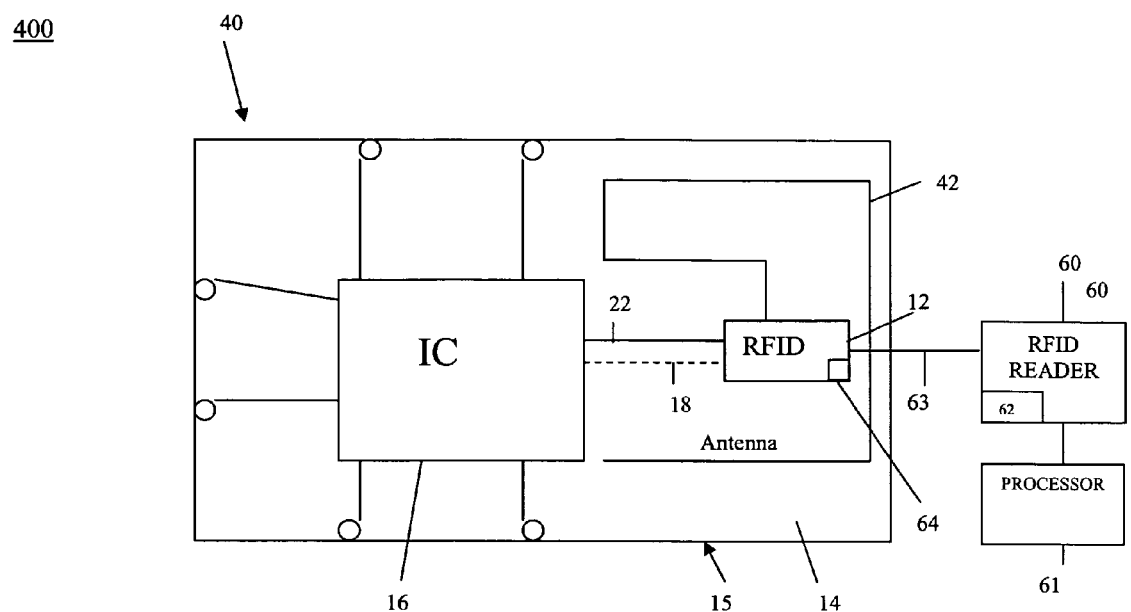
FIG. 9 is a schematic diagram of the RFID device shown in FIG. 4 in communication with an RFID reader.
Figure 10:
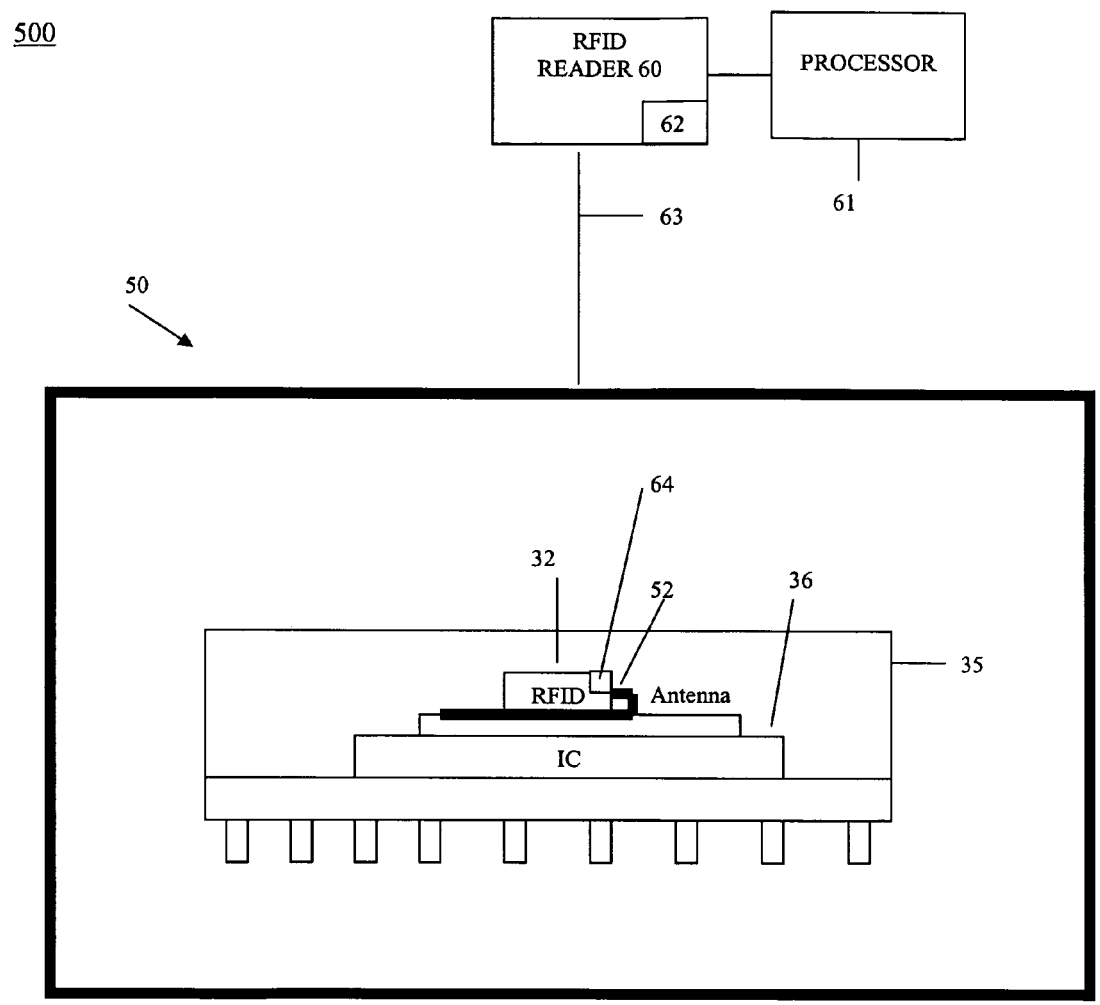
FIG. 10 is a schematic diagram of the RFID device shown in FIG. 5 in communication with an RFID reader.

FIG. 5 is a schematic diagram of RFID device 50 in accordance with the teachings of the present invention. Antenna 52 is located around RFID transceiver 32 on integrated circuit (IC) 36.

Referring to FIGS. 6-10, RFID systems 100, 200, 300, 400 and 500 comprise respective RFID devices 10, 20, 30, 40 or 50, which can communicate with RFID reader 60. RFID reader 60 generates signals for transmission to RFID devices 10, 20, 30, 40, or 50 and receives signals or information from RFID devices 10, 20, 30, 40, or 50. RFID reader 60 uploads received information to processor 61.

Figure 11:
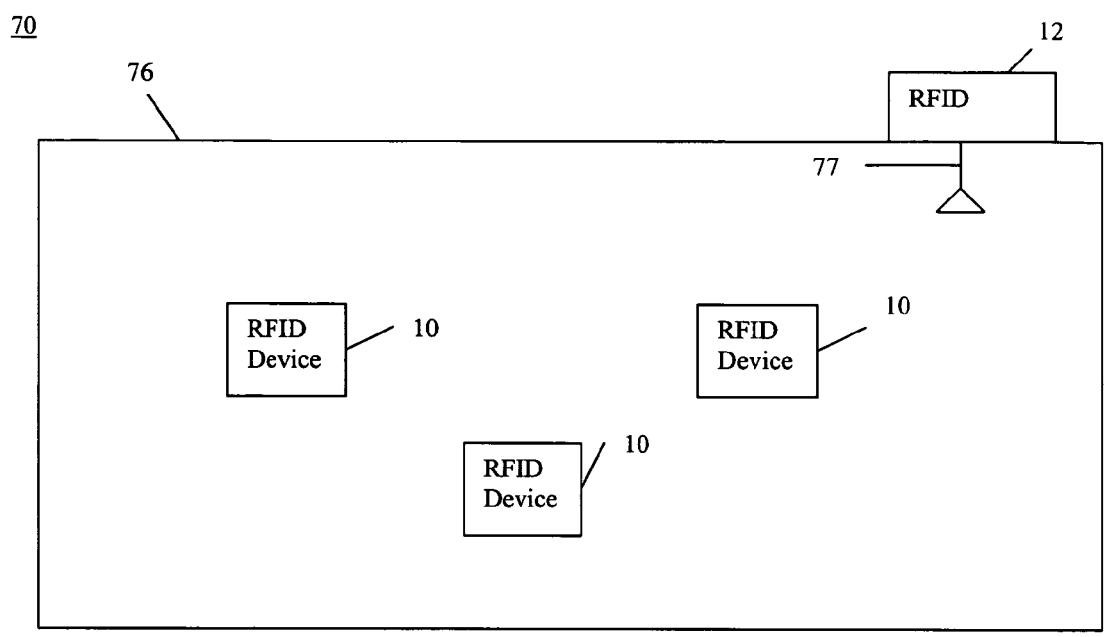
FIG. 11 is a schematic diagram of a nested RFID.

In one embodiment, RFID reader 60 can be implemented as a nested RFID 70 as shown in FIG. 11 for communicating with RFID devices 10, 20, 30, 40 and 50. As shown in FIG. 11, RFID 12 is located on the outside of an enclosure 76. When RFID 12 is probed, RFID 12 sends probe signals through antenna 77, which is inside the enclosure, to RFID device 10 inside the enclosure, which then respond to the probe from RFID 12. RFID devices which are shown as RFID device 10 can also be RFID devices 20, 30, 40 or 50. In an alternate embodiment, the RFID devices within enclosure 76 could also be RFIDs on the outside of another enclosure 76 that in the same manner as described above probe RFIDs inside this enclosure. Accordingly, the RFIDs can be nested to any desired level.

In one embodiment, RFID transceiver 12 or RFID transceiver 32 can receive an encoded signal from RFID reader 60 or nested RFID 70 and generate probe signals along various integrated circuit traces of integrated circuit (IC) 16 or integrated circuit (IC) 36, as shown in respective FIGS. 6-10. Also, integrated circuit (IC) 16 or integrated circuit (IC) 36 or RFID transceiver 12 or RFID transceiver 32 can generate particular signals based on the response of the probe signals, and then transmit the particular response signal from RFID transceiver 12 or RFID transceiver 32 back to RFID reader 60 or nested RFID 70. Processor 61 communicates with RFID reader 60 to receive the particular response signal and process the information.

RFID systems 100, 200, 300, 400 and 500 can be used to verify the correctness, reliability, and functionality of integrated circuits after fabrication to ensure that the various integrated circuit blocks function as designed and that additional circuitry or embedded functions have not been surreptitiously added to the circuit, i.e., to enable users to trust the integrated circuits they employ. In one embodiment, RFID probe-response signals generated by integrated circuit (IC) 16 or integrated circuit (IC) 36 or RFID transceiver 12 or RFID transceiver 32 can be based on a secure challenge-response protocol to ensure that when a response is received, the device receiving the response to its challenge can be assured that the response was generated with authenticated verification of the intended device characteristics, i.e. it is necessary to be able to discriminate against devices which have been altered, but respond as if they have not.

In one embodiment, encoded signals 62 can be communicated from RFID reader 60 or nested RFID 70 to RFID transceiver 12 or RFID transceiver 32 over connection 63. The encoded signals can be used to protect integrated circuit (IC) 16 or integrated circuit (IC) 36 or packaging 14 from reverse engineering. If integrated circuit (IC) 16 or integrated circuit (IC) 36 or packaging 14 is opened or probed without RFID transceiver 12 or RFID transceiver 32 first receiving a proper encoded signal 62, either from user-specified RFID reader 60 or a nested RFID 70, RFID transceiver 12 or RFID transceiver 32 can send out signals along interconnection 18 to permanently modify or destroy integrated circuit (IC) 16 or integrated circuit (IC) 36 within a period of time around when an indication of tampering or probing of semiconductor device 15 or packaging 14 is received by RFID device 10. Alternatively, the receipt of a proper encoded signal 62 by RFID transceiver 12 or RFID transceiver 32 allows access to integrated circuit (IC) 16 or integrated circuit (IC) 36 without modification or destruction.

In one embodiment, if integrated circuit (IC) 16 or integrated circuit (IC) 36 or packaging 14 is opened or probed without RFID transceiver 12 or RFID transceiver 32 first receiving a proper encoded signal 32, either from user-specified RFID reader 60 or nested RFID 70, integrated circuit (IC) 16 or integrated circuit (IC) 36 is either permanently or temporarily disabled in order to deter theft.

In one embodiment, encoded signal 62 from RFID reader 60 or a nested RFID 70 can be used to signal RFID transceiver 12 to cause a change in the operation of integrated circuit (IC) 16 or integrated circuit (IC) 36 or an associated subsystem. For example, signal traces within integrated circuit (IC) 16 or integrated circuit (IC) 36 can be disabled or harmful voltages can be applied to integrated circuit (IC) 16 or integrated circuit (IC) 36 with the purpose of causing its destruction. This mode of operation can be similar to that described above for preventing probing or reverse engineering of integrated circuit (IC) 16 or integrated circuit (IC) 36, but can be carried out as a direct result of an authorized user or process command.

In one embodiment, RFID systems 100, 200, 300, 400 or 500 can be used to locate, identify and track semiconductor device 15 items. RFID devices 10, 20, 30, 40 or 50 include a unique RFID address 64. RFID address 64 can be communicated to RFID reader 60 or nested RFID 70. Processor 61 can process RFID address 64 for locating, identifying or tracking associated semiconductor device 15.

Figure 12:
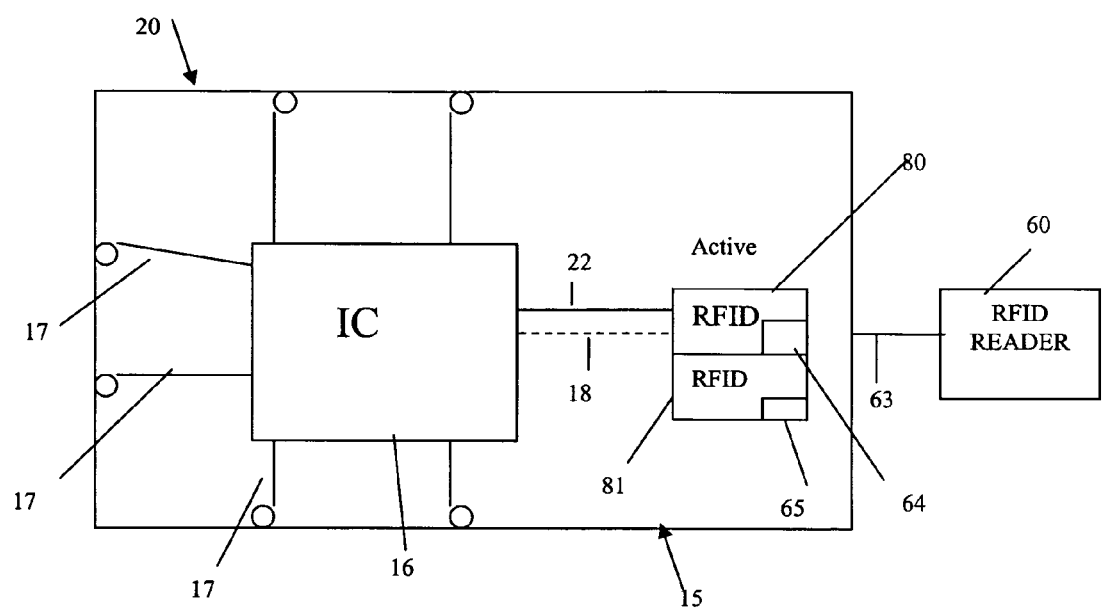
FIG. 12 is a schematic diagram of the concatenation of addresses by placing multiple RFIDs together.

In one embodiment, a long address, such as having a length of about 128 bytes, can be used for RFID transceiver 12 or RFID transceiver 32 to distinguish RFID transceiver 12 or RFID transceiver 32 from every other RFID. Alternatively, RFID transceiver 12 or RFID transceiver 32 can be located on a palette or inside an enclosure in which only a small number of RFIDs communicate with RFID reader 60 or nested RFID reader 70. In this embodiment, the address of the internal RFID can be reduced. Accordingly, a lower cost RFID can use a shorter address. However, to save cost, it is typically not desirable to make separate RFIDs with different address lengths. In one embodiment, a growable address RFID can be used in which a plurality of RFID transceivers 12 or RFID transceivers 32 can be associated in order to provide longer addresses. As shown in FIG. 12, multiple RFIDs 12, referred to as RFIDs 80 and 81 having addresses 64 and 65, respectively, are placed together, each containing a portion of the address. Although each only contains a portion of the address, when located together, the combination of RFIDs only responds to the concatenated address of address 64 and 65. Accordingly, only one type of RFID IC can be manufactured, but by combining these RFIDs by putting two or more RFID circuits within a package, any length address RFID can be created. Instead of the traditional linear address space, two RFIDs working in concert can create a two-dimensional address space, with the potential address range equal to the square of a single device's address space. In an alternate embodiment, it is possible to go beyond two RFIDs to grow the effective address space without practical limits. This approach is feasible for two reasons: first, due to high volume manufacturing and the embedding of RFIDs directly into other packages the incremental cost is very low; second, the low duty cycle and inherent ability to avoid RFID collisions in a multi-RFID environment allows multiple RFIDs on one tracked item to respond independently to a probing signal.

Placing RFID transceiver 12 or RFID transceiver 32 and respective antenna 42 or antenna 52 in the same packaging or as a block of integrated circuit (IC) 16 or integrated circuit (IC) 36 can create interference between the RFID transceiver 12 or RFID transceiver 32 and integrated circuit (IC) 16 or integrated circuit (IC) 36. This problem can be alleviated because the RFID signal is well defined and occurs only when RFID transceiver 12 is probed. The RFID signal can be canceled on integrated circuit (IC) 16 or integrated circuit (IC) 36, by correlating the known probe signal with any noise on integrated circuit (IC) 16 or integrated circuit (IC) 36 and canceling such correlation, or by scheduling the probe and response when integrated circuit (IC) 16 or integrated circuit (IC) 36 is not active. Similarly, the clock and interference from integrated circuit (IC) 16 or integrated circuit (IC) 36 into RFID transceiver 12 or RFID transceiver 32 IC is also well defined and can be canceled or avoided.

In an alternate embodiment, a plurality of RFID transceivers 12 can be embedded within packaging 76, as shown in FIG. 11. This embodiment provides additional tracking possibilities taken separately or in conjunction, including tracking by different entities, different companies, different security protocols and the like.

ICs in devices are often located within shielded housings in the device, or multiple devices may be partially shielded within a larger group of devices, such as when they are on a palette. In this case, it may be difficult to get a probe signal to the RFID from the outside. In addition, for security, one may not want to have all the RFIDs available to respond to any probe signal, which could then be used to identify all the RFIDs within a given area. Therefore, a nested approach is used whereby the RFIDs within an enclosure communicate only to an RFID located on the surface of that enclosure. In this case the RFID would have an antenna located inside the enclosure to communicate to the RFIDs in the enclosure, as well as an antenna outside the enclosure to communicate with an external reader. The RFID on the enclosure could provide a higher degree of security (encryption) than those inside the enclosure, and there could be only a thin wire connecting through the enclosure for the two antennas and RFID IC. Thus, access to the RFIDs inside the enclosure would be restricted to the RFID on the enclosure, and much lower cost RFIDs could be used inside the enclosure.

In all the above-described embodiments, the packaging cost of the RFID is eliminated as it is included with the packaging of the semiconductor, dramatically reducing the cost of implementing the RFID. In the embodiments of the RFID transceiver as a separate circuit block or independent circuit within the semiconductor device, additional circuitry cost of the RFID is nearly eliminated.

Through re-use the cost of implementing RFID technology is shared by each device desired to be located, identified and tracked in the business process which opens the RFID benefits to stand-alone low value products and less voluminous, high value products.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

The invention claimed is:

1. A radio-frequency identification (RFID) system comprising:
    an RFID device comprising an RFID transceiver interconnected to a semiconductor device;
    an RFID reader;
    means for generating an encoded signal;
    means for transmitting said encoded signal between said RFID reader and said RFID transceiver;
    means for generating a signal based on said received encoded signal;
    means for transmitting said generated signal from said RFID transceiver to said RFID reader;
    means for determining if a proper said encoded signal is received at said RFID transceiver; and
    means for permanently or temporarily modifying or destroying said semiconductor device if said proper encoded signal is not received at said RFID transceiver within a period of time around when an indication of tampering or probing of said semiconductor device or packaging of said semiconductor device is received by the RFID device.

2. The RFID device of claim 1 wherein said RFID transceiver is embedded within packaging of said semiconductor device.

3. The RFID device of claim 2 wherein said RFID is a circuit of said semiconductor device.

4. The RFID device of claim 3 further comprising:
an antenna positioned around said RFID transceiver.

5. The RFID device of claim 4 wherein said antenna is positioned on said packaging.

6. The RFID device of claim 3 further comprising:
an antenna positioned on said RFID transceiver.

7. The RFID device of claim 3 further comprising:
an antenna positioned on said RFID transceiver and said semiconductor device.

8. The RFID device of claim 1 wherein said semiconductor device comprises:
an integrated circuit and said RFID transceiver is located on said integrated circuit.

9. The RFID device of claim 8 further comprising:
an antenna around said RFID transceiver and on top of said integrated circuit.

10. The RFID device of claim 1 further comprising:
means for generating a signal based on said received encoded signal; and
means for transmitting said generated signal from said RFID transceiver to said RFID reader.

11. The RFID device of claim 1 wherein said encoded signal comprises a signal to permanently or temporarily disable said semiconductor device, the RFID device further comprising:
means for determining if said encoded signal is received at said RFID transceiver; and
means for permanently or temporarily disabling said semiconductor device if said encoded signal is received at said RFID transceiver.

12. The RFID device of claim 1 further comprising:
means for generating a RFID address from one or more addresses at a respective one or more said RFID transceivers; and
means for communicating said RFID address to said RFID reader.

13. A system for verifying a semiconductor device comprising:
an RFID transceiver interconnected to a semiconductor device;
an RFID reader;
means for generating an encoded signal;
means for transmitting said encoded signal between said RFID reader and said RFID transceiver;
means for generating a signal based on said received encoded signal;
means for transmitting said generated signal from said RFID transceiver to said RFID reader;
a processor for processing said generated signal to verify said semiconductor device;
means for determining if a proper said encoded signal is received at said RFID transceiver; and
means for permanently or temporarily modifying or destroying said semiconductor device if said proper encoded signal is not received at said RFID transceiver within a period of time around when an indication of tampering or probing of said semiconductor device or packaging of said semiconductor device is received by the RFID device.

14. The system of claim 13 wherein said encoded signal comprises a signal to permanently or temporarily disable said semiconductor device further comprising:
means for determining if said encoded signal is received at said RFID transceiver; and
means for permanently or temporarily disabling said semiconductor device if said encoded signal is received at said RFID transceiver.

15. The system of claim 13 wherein said RFID transceiver is embedded within packaging of said semiconductor device.

16. The system of claim 13 further comprising:
an antenna positioned around or on said RFID transceiver and/or said semiconductor device.

17. The system of claim 13 wherein said semiconductor device comprises:
an integrated circuit and said RFID transceiver is located on said integrated circuit.

18. The system of claim 17 wherein an antenna around said RFID transceiver and on top of said integrated circuit.

19. A method for verifying a semiconductor device comprising the steps of:
interconnecting an RFID transceiver interconnected to a semiconductor device;
generating an encoded signal at an RFID reader;
transmitting said generated signal from said RFID transceiver to said RFID reader;
processing said generated signal to verify said semiconductor device:
determining if a proper said encoded signal is received at said RFID transceiver; and;
modifying said semiconductor device if said proper encoded signal is not received at said RFID transceiver within a period of time around when an indication of tampering or probing of said semiconductor device or packaging of said semiconductor device is received by the RFID device.

20. The method of claim 19 further comprising the steps of:
determining if a proper said encoded signal is received at said RFID transceiver; and;
disabling said semiconductor device if said proper encoded signal is received at said RFID transceiver.

21. A radio-frequency identification (RFID) system comprising:
an RFID device comprising a first RFID transceiver interconnected to an enclosure,
the RFID having an antenna within the enclosure that probes at least one second RFID transceiver interconnected to a semiconductor device within the enclosure, said at least one second RFID transceiver is embedded within packaging of said semiconductor device;
an RFID reader;
means for generating an encoded signal;
means for transmitting said encoded signal between said RFID reader and said first RFID transceiver;
means for determining if a proper said encoded signal is received at said first RFID transceiver; and
means for permanently or temporarily modifying or destroying said semiconductor device if said proper encoded signal is not received at said first RFID transceiver within a period of time around when an indication of tampering or probing of said semiconductor device, packaging of said semiconductor device including of said semiconductor or said enclosure, is received by the RFID device.

22. The RFID device of claim 21 wherein said at least one second RFID transceiver is a circuit of said semiconductor device.

23. The RFID device of claim 22 further comprising:
an antenna positioned around said at least one second RFID transceiver.

24. The RFID device of claim 23 wherein said antenna is positioned on said packaging.

25. The RFID device of claim 22 further comprising:
an antenna positioned on said at least one second RFID transceiver.

26. The RFID device of claim 22 further comprising:
an antenna positioned on said at least one second RFID transceiver and said semiconductor device.

27. The RFID device of claim 21 wherein said semiconductor device comprises:
an integrated circuit and said at least one second RFID transceiver is located on said integrated circuit.

28. The RFID device of claim 27 further comprising:
an antenna around said at least one second RFID transceiver and on top of said integrated circuit.

29. The RFID device of claim 21 further comprising:
means for generating a signal based on said received encoded signal; and
means for transmitting said generated signal from said first RFID transceiver to said RFID reader.

30. The RFID device of claim 21 wherein said encoded signal comprises a signal to permanently or temporarily disable said semiconductor device further comprising:
means for determining if said encoded signal is received at said first RFID transceiver; and
means for permanently or temporarily disabling said semiconductor device if said encoded signal is received at said first RFID transceiver.

31. The RFID device of claim 21 further comprising:
means for generating a RFID address from one or more addresses at a respective one or more said at least one second RFID transceivers; and
means for communicating said RFID address to said RFID reader.

* * * * *